(12) United States Patent
Tien et al.

(10) Patent No.: US 7,426,003 B2
(45) Date of Patent: Sep. 16, 2008

(54) PIXEL STRUCTURE AND LIQUID CRYSTAL DISPLAY PANEL HAVING PARTICULAR TRANSITION ELECTRODE

(75) Inventors: Hao-Ting Tien, Taipei County (TW); Chien-Lin Pan, Taoyuan County (TW); Kuan-Chiun Hu, Hsinchu County (TW); Chao-Dong Syu, Miaoli County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 439 days.

(21) Appl. No.: 11/306,770

(22) Filed: Jan. 11, 2006

(65) Prior Publication Data

US 2007/0152941 A1    Jul. 5, 2007

(30) Foreign Application Priority Data

Jan. 2, 2006    (TW) ............................. 95100046 A

(51) Int. Cl.
G02F 1/1347  (2006.01)
G02F 1/1343  (2006.01)
(52) U.S. Cl. ............................. 349/75; 349/139; 349/38
(58) Field of Classification Search ............ 349/75, 349/139, 38, 39
See application file for complete search history.

(56) References Cited

U.S. PATENT DOCUMENTS

| 5,066,105 | A | * | 11/1991 | Yoshimoto et al. ............ 349/53 |
| 6,603,525 | B2 | * | 8/2003 | Yamakita et al. ............ 349/139 |
| 6,661,491 | B2 | * | 12/2003 | Yamakita et al. ............ 349/139 |
| 6,671,009 | B1 | * | 12/2003 | Hattori et al. ............ 349/33 |
| 6,833,893 | B2 | | 12/2004 | Kikkawa ............ 349/117 |
| 2003/0052847 | A1 | * | 3/2003 | Okishiro et al. ............ 345/87 |

FOREIGN PATENT DOCUMENTS

| CN | 1139763 | 1/1997 |
| CN | 1371016 | 9/2002 |
| JP | 2004354407 | 12/2004 |

OTHER PUBLICATIONS

"High-Speed Bend Transition Method using Electrical Twist Field in OCB Mode TFT-LCDs" jointly authored by Nakao, et al., SID Digest, pp. 1416-1419, 2004.

* cited by examiner

*Primary Examiner*—Mike Qi
(74) *Attorney, Agent, or Firm*—Jianq Chyun IP Office

(57) ABSTRACT

A pixel structure for being driven by a scan line and a data line is provided. The pixel structure includes an active device, a pixel electrode, an insulating layer, and a transition electrode. The active device is electrically connected to the scan line and the data line. The pixel electrode is electrically connected to the active device. The insulating layer is disposed over the scan line, the data line, and the pixel electrode. The transition electrode is disposed on the insulating layer, and a transverse electric field is produced between the transition electrode and the pixel electrode.

22 Claims, 8 Drawing Sheets

PIXEL STRUCTURE AND LIQUID CRYSTAL DISPLAY PANEL HAVING PARTICULAR TRANSITION ELECTRODE

CROSS-REFERENCE TO RELATED APPLICATION

This application claims the priority benefit of Taiwan application serial no. 95100046, filed on Jan. 2, 2006. All disclosure of the Taiwan application is incorporated herein by reference.

BACKGROUND OF THE INVENTION

1. Field of Invention

The present invention relates to a pixel structure and a liquid crystal display panel. More particularly, the present invention relates to a pixel structure and a liquid crystal display panel having transition electrode.

2. Description of Related Art

As the demand for display devices increases, the efforts dedicated to the development of the relative display devices have been made. Wherein, the cathode ray tube (CRT) has been dominating the display device market for its excellent display quality and mature d technology. However, recently, with the rise of the green environment protection concept, coupled with the disadvantage of high power consumption and high radiation, plus the limited flat panel design capability, CRT can not meet the requirements of the market trend for light, thin, short, small, and power-saving display product. Therefore, the thin film transistor liquid crystal display (TFT-LCD), having such advantages as high image quality, high space utilization efficiency, low power consume, and no radiation, has become the main stream product in the market.

The liquid crystal display devices can be divided into different types according to the type of the liquid crystal, the driving method and the configuration position of the light source. Wherein, the optically compensated birefringence liquid crystal display (OCB LCD), with quick response speed, can provide the computer with smoother image presentation while displaying continuous quickly changing images, such as cartoons or films. The OCB LCD is suitable for high-end liquid crystal display (LCD) device. However, only after part of the liquid crystal molecules are transformed into a twist state from a splay state, then, transformed into a bend state, the OCB LCD can enter standby status to provide quick response operation.

FIG. 1A is a schematic diagram of the liquid crystal molecules in a splay state in a liquid crystal display panel. FIG. 1B is a schematic diagram of the liquid crystal molecule in a bend state in a liquid crystal display panel. Referring to FIG. 1A and FIG. 1B simultaneously, in the OCB LCD panel 10, the liquid crystal layer 11 is disposed between the upper substrate 12 and the lower substrate 13. The rubbing directions of the alignment layers disposed on the upper substrate 12 and the lower substrate 13 are parallel. When the liquid crystal molecules in the liquid crystal layers 11 are not affected by external electric fields, they are arranged in a splay state. When the OCB LCD device turns into a standby status, an electric field perpendicular to the upper substrate 12 must be applied on the liquid crystal molecules. Accordingly, parts of the liquid crystal molecules are transformed into a bend state. In the conventional OCB LCD devices, in order to drive the pixels normally, it may need several minutes to perform the transforming process; that is, a long warming-up is required before the OCB LCD turns into a standby status. However, it works against the open-and-play characteristic necessary for the liquid crystal displays. Therefore, in order for the OCB LCD devices to be more acceptable by the consumers, fast transition is necessary.

In order to have the liquid crystal molecules in the OCB LCD panel transform to a bend state from a splay state quickly, a conventional technology is to generate stronger electric field by increasing the voltage, so that the liquid crystal molecules can be transformed to a bend state from a splay state quickly. However, it is not easy to find the suitable driving chip which can bear the high voltage, and it is not easy to conduct the related research and development. Another common method in the conventional technology is by adding polymer in the liquid crystal layer. When the liquid crystal molecules are in a bend state, the ultraviolet radiation is radiated on the polymer to form a high molecule wall. Accordingly, the liquid crystal molecules can be kept to be arranged in a bend state. Although the method is simple, it will result in light leakage in the OCB LCD panel. In addition, in other conventional methods, for example, slits are formed in the pixel electrode or bumps are formed above the pixel electrode by a special pixel design. Accordingly, the arrangement type of the liquid crystal molecules in the partial region can be changed, to accelerate the process of the transition from a splay state to a bend state.

SUMMARY OF THE INVENTION

Accordingly, the present invention is directed to provide a pixel structure, which can speedily transform the liquid crystal molecules in the optically compensated birefringence liquid crystal display (OCB LCD) from a splay state to a bend state.

Another objective of the present invention is to provide a liquid crystal display panel with short response time.

According to above and other aspects of the present invention, a pixel structure for being driven by a scan line and a data line is provided. The pixel structure includes an active device, a pixel electrode, an insulating layer, and a transition electrode. The active device is electrically connected to the scan line and the data line. The pixel electrode is electrically connected to the active device. The insulating layer is disposed over the scan line, the data line, and the pixel electrode. The transition electrode is disposed on the insulating layer, and a transverse electric field is produced between the transition electrode and the pixel electrode.

According to one embodiment of the present invention, the material of the transition electrode includes a transparent or opaque conducting material. The material of the transition electrode includes indium tin oxide (ITO), indium zinc oxide (IZO) or metal.

According to one embodiment of the present invention, the transition electrode is disposed over the pixel electrode.

According to one embodiment of the present invention, the transition electrode is disposed over the scan line.

According to one embodiment of the present invention, the transition electrode is electrically connected to a first common voltage $V_1$; the pixel electrode is electrically connected to a driving voltage $V_d$; the absolute value of the voltage difference between the first common voltage $V_1$ and the driving voltage $V_d$ is between about 3 voltage and 7 voltage.

According to one embodiment of the present invention, the pixel structure further includes an alignment layer, disposed over the insulating layer and the transition electrode, and the alignment layer has a rubbing direction. In addition, the rubbing direction is different from the direction of the transverse electric field.

According to one embodiment of the present invention, the pixel structure further includes a capacitor electrode, disposed under the pixel electrode.

According to one embodiment of the present invention, the transition electrode is disposed on the insulating layer over the capacitor electrode.

The present invention also provides a liquid crystal display panel, including an active device array substrate, a color filter substrate, and a liquid crystal layer. The color filter substrate is disposed over the active device substrate. The liquid crystal layer is disposed between the active device array substrate and the color filter substrate. The active device array substrate includes a first substrate, a plurality of scan lines, a plurality of data lines, and a plurality of pixel structures. Both of the scan lines and data lines are disposed on the first substrate. The pixel structures are disposed on the first substrate, and are driven by the scan lines and the data lines, respectively. Each pixel structure includes an active device, a pixel electrode, an insulating layer, and a transition electrode. The active device is electrically connected to the corresponding scan line and data line. The pixel electrode is electrically connected to the corresponding active device. The insulating layer is disposed over the scan line, the data line, and the pixel electrode. The transition electrode is disposed on the insulating layer, and a transverse electric field is produced between the transition electrode and the pixel electrode. The color filter substrate includes a second substrate, a common electrode, and a color filter layer. The common electrode is disposed over the second substrate. The color filter layer is disposed between the second substrate and the common electrode.

According to one embodiment of the present invention, the material of the transition electrode of the active device array substrate includes a transparent or opaque conducting material. However, the material of the transition electrode includes indium tin oxide, indium zinc oxide or metal.

According to one embodiment of the present invention, the transition electrode of the active device array substrate is disposed over the pixel electrode.

According to one embodiment of the present invention, the transition electrode of the active device array substrate is disposed over the scan line.

According to one embodiment of the present invention, the transition electrode of the active device array substrate is electrically connected to a first common voltage $V_1$; the pixel electrode is electrically connected to a driving voltage $V_d$; the absolute value of the voltage difference between the first common voltage $V_1$ and the driving voltage $V_d$ is between about 3 voltage and 7 voltage.

According to one embodiment of the present invention, the active device array substrate further includes an alignment layer, disposed on the insulating layer and the transition electrode, and the alignment layer has a rubbing direction. In addition, the rubbing direction is different from the direction of the transverse electric field.

According to one embodiment of the present invention, each pixel structure of the active device array substrate further includes a capacitor electrode, disposed under the pixel electrode.

According to one embodiment of the present invention, the transition electrode of the active device array substrate is disposed on the insulating layer over the capacitor electrode.

According to one embodiment of the present invention, the transition electrode of the active device array substrate is electrically connected to a first common voltage $V_1$; the common electrode of the color filter substrate is electrically connected to a second common voltage $V_2$; the absolute value of the voltage difference between the first common voltage $V_1$ and the second common voltage $V_2$ is greater than 15 voltage. In a preferred embodiment of the present invention, the absolute value of the voltage difference between the first common voltage $V_1$ and the second common voltage $V_2$ is between 15 voltage and 32 voltage.

In summary, in the pixel structure of the present invention, a transverse electric field is produced between the transition electrode and the pixel electrode. If the pixel structure is used in a liquid crystal display panel, the arrangement of the liquid crystal molecules in a partial region can be changed firstly. When the liquid crystal display panel displays images, the remaining liquid crystal molecules can be transformed to a bend state quickly, so that the response time of the liquid crystal display panel can be shortened. In addition, in the liquid crystal display panel, the voltage difference between the transition electrode and the color filter substrate can also be adjusted to change the intensity of the transverse electric field, so that the liquid crystal display panel can present faster response time.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
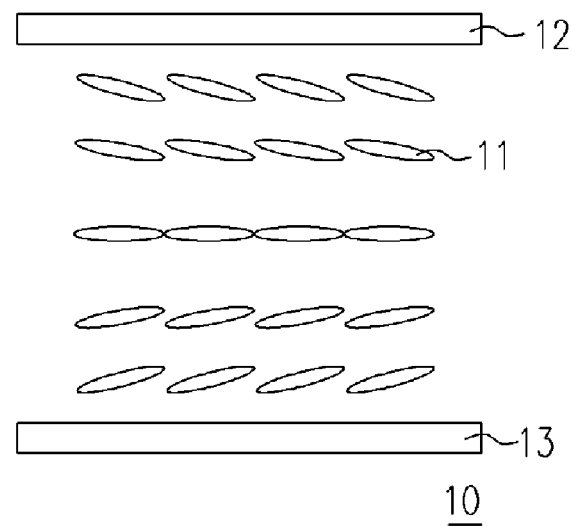
FIG. 1A is a schematic diagram of the liquid crystal molecule in a splay state in a liquid crystal display panel.
Figure 1B:
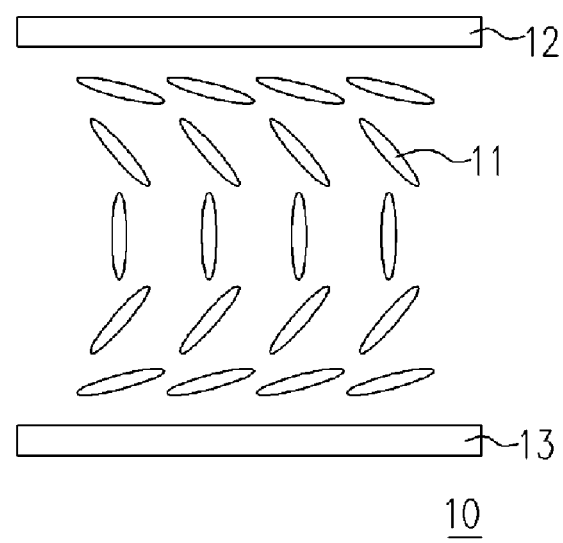
FIG. 1B is a schematic diagram of the liquid crystal molecule in a bend state in a liquid crystal display panel.
Figure 2A:
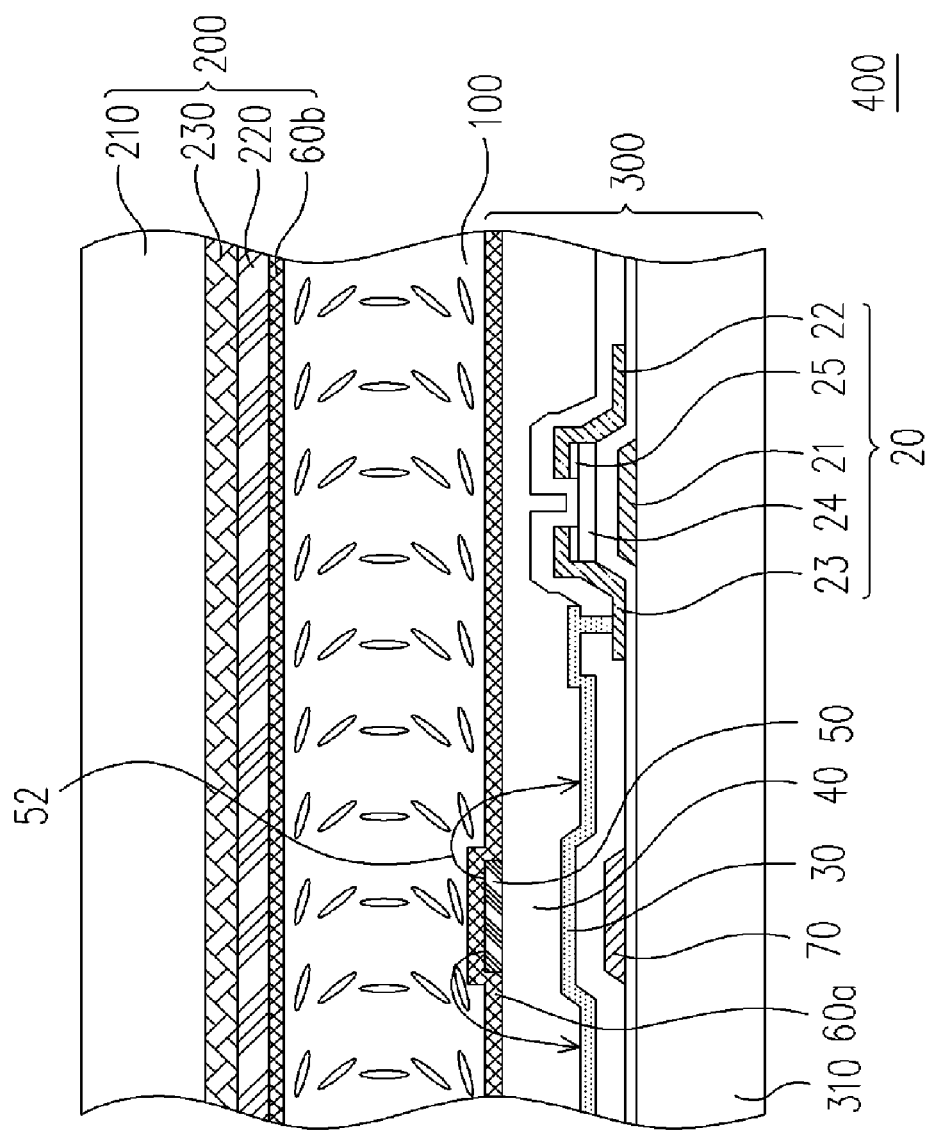
FIG. 2A is a cross-sectional schematic diagram of a liquid crystal display panel according to one embodiment of the present invention.
Figure 2B:
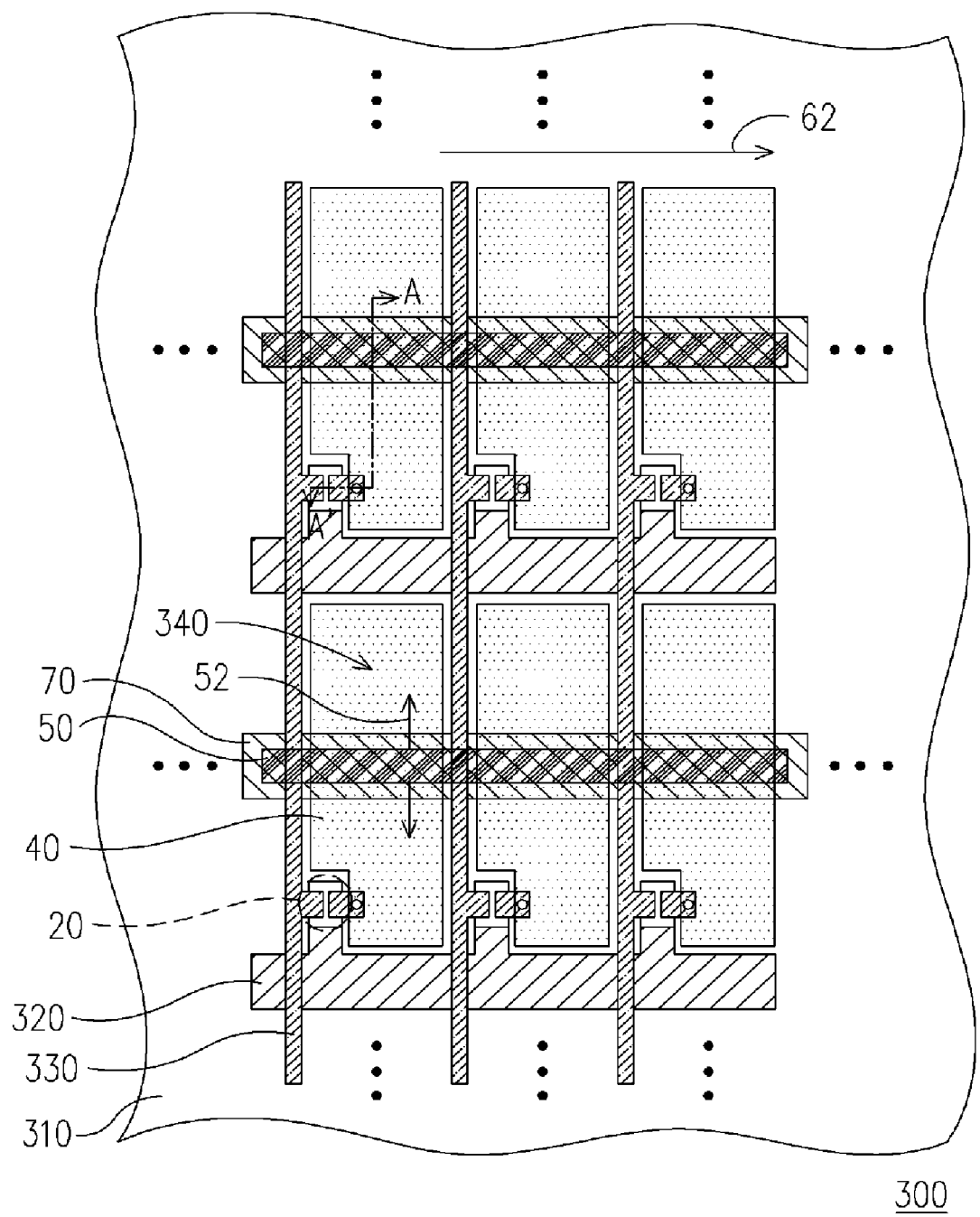
FIG. 2B is a top view of the active device array substrate of the liquid crystal display panel in FIG. 2A.

FIG. 2A is a cross-sectional schematic diagram of a liquid crystal display panel according to one embodiment of the present invention. FIG. 2B is a top view of the active device array substrate of the liquid crystal display panel in FIG. 2A. Referring to FIG. 2A and FIG. 2B, the liquid crystal display panel 400 is an optically compensated birefringence liquid crystal display (OCB LCD) panel, and the liquid crystal display panel includes an active device array substrate 300, a color filter substrate 200, and a liquid crystal layer 100. The color filter substrate 200 is disposed over the active device array substrate 300, and the liquid crystal layer 100 is disposed between the color filter substrate 200 and the active device array substrate 300.

The active device array substrate 300 includes a first substrate 310, a plurality of scan lines 320, a plurality of data lines 330, and a plurality of pixel structures 340. The first substrate 310 is, for example, a glass substrate, a quartz glass substrate, or a substrate of other suitable materials. The scan lines 320 can be a conducting wire made of aluminum alloy conducting wire or other suitable conducting materials, and these scan lines 320 are disposed on the first substrate 310. The data lines 224 can be a chrome conducting wire, aluminum alloy conducting wire or conducting wires of other suitable conducting material, and these data lines 224 are also disposed on the first substrate 310. The pixel structures 340 are disposed on the first substrate 310, and are driven by the corresponding scan lines 320 and the data lines 330, and each of the pixel structures 340 includes an active device 20, a pixel electrode 30, an insulating layer 40 and a transition electrode 50. The active device 20 is, for example, a thin film transistor, a switch device with three terminals, or other suitable devices, and the active device 20 is electrically connected to the scan lines 320 and data lines 330. In the embodiment, the active device 20 is shown as a thin film transistor. The active device 20 has a gate 21, a source 22, a drain 23, a channel layer 24, and an ohmic contact layer 25 (as shown in FIG. 2A). The pixel electrode 30 is electrically connected to the active device 20. The pixel electrode 30 is, for example, a transmissive electrode, a reflective electrode, or a transflective electrode. The material of the pixel electrode 30 includes indium tin oxide, indium zinc oxide, metal, or other transparent or opaque conducting materials. The insulating layer 40 is disposed over the scan line 320, the data line 330 and the pixel electrode 30. The material of the insulating layer 40 includes, for example, organic photosensitive material, silicon nitride, silicon oxynitride or other suitable insulation materials. The insulating layer 40 may be a planarizing layer. The transition electrode 50 is disposed on the insulating layer 40, and a transversal electric field 52 is produced between the transition electrode 50 and the pixel electrode 30. Note that the transversal electric field 52 is the electric field beginning from (or ending to) the transition electrode 50 and ending to (or beginning from) the pixel electrode 30, and the direction of the transversal electric field 52 can vary according to the different position and shape of the transition electrode 50.

The color filter substrate 200 includes a second substrate 210, a common electrode 220, and a color filter layer 230. The second substrate 210 is, for example, a glass substrate, a quartz glass substrate, or a substrate of other suitable materials. The material of the common electrode 220 is, for example, indium tin oxide, indium zinc oxide or other suitable conducting materials, and the common electrode 220 is disposed over the second substrate 210. The color filter layer 230 is disposed between the second substrate 210 and the common electrode 220.

In the embodiment as shown in FIG. 2B, the transition electrode 50 is a strip-shaped electrode, and the transition electrodes 50 disposed on the pixel structures 340 in the same column are connected to each other. The material of the transition electrodes 50 includes, for example, indium tin oxide, indium zinc oxide, metal, or other transparent or opaque conducting materials, and the transition electrodes 50 are disposed over the pixel electrode 30. In addition, the pixel structure 340 further includes an alignment layer 60a and a capacitor electrode 70. The material of the alignment layer 60a includes, for example, polyimide resin (PI) or other suitable materials, and the alignment layer 60a is disposed over the insulating layer 40 and the transition electrode 50, and the alignment layer 60a has a rubbing direction 62. The material of the capacitor electrode 70 includes, for example, metal, alloy or other suitable conducting materials, and the capacitor electrode 70 is disposed under the pixel electrode 30. The transition electrode 50 is disposed on the insulating layer 40 over the capacitor electrode 70. Note that the rubbing direction 62 is different from the direction of the transversal electric field 52. In the pixel structure 340 of the present embodiment, the configuration of the transition electrode 50 is designed to make the transversal electric fields 52 in every position as perpendicular to the rubbing direction 62 as possible. In addition, the common electrode 220 of the color filter substrate 200 further includes an alignment layer 60b, and the rubbing direction of the alignment layer 60b is the same or parallel to the rubbing direction 62 of the alignment layer 60a.

In the liquid crystal display panel 400, the pixel structure 340 can be designed to be able to pre-change the arrangement of the liquid crystal molecules in a partial region. Usually, before the liquid crystal display panel 400 displays the image, the transition electrode 40 of the pixel structure 340 is electrically connected to a first common voltage $V_1$, and the pixel electrode 30 is electrically connected to a driving voltage $V_d$. The first common voltage $V_1$ is a fixed voltage, and the driving voltage $V_d$ may vary according to the image to be displayed. Note that the absolute value of the voltage difference between the first common voltage $V_1$ and the driving voltage $V_d$ is preferred to be between 3 voltage and 7 voltage. Accordingly, a transversal electric field 52 is produced between the transition electrode 50 and the pixel electrode 30. In the liquid crystal layer 100, part of the liquid crystal molecules originally in a splay state may firstly twist to transform to a twist state by the transversal electric field, then transform from the twist state to a bend state. When the liquid crystal display panel 400 displays the images, a vertical electric field may be formed in the liquid crystal layer 100. Compared to the conditions that all the liquid crystal molecules are in a splay state, as part of the liquid crystal molecules are in a bend state, the remaining liquid crystal molecules in the embodiment can be transformed to a bend state more quickly. That is, the liquid crystal display panel 400 has quicker response time in a normal driving method.

As mentioned above, in the liquid crystal display panel 400, the common electrode 220 of the color filter substrate 200 is electrically connected to a second common voltage $V_2$. The absolute value of the voltage difference between the first common voltage $V_1$ and the second common voltage $V_2$ is greater than 15 voltage. For example, the absolute value of the voltage difference between the first common voltage $V_1$ and the second common voltage $V_2$ is between 15 voltage and 32 voltage when the liquid crystal display panel 400 is at a warm-up state for 1~2 seconds. The intensity of the transversal electric field can be changed by adjusting the voltage difference between the transition electrode 50 and the common electrode 220 of the color filter substrate 200. Accordingly, before the liquid crystal display panel displays images, more liquid crystal molecules may be in a bend state. When the liquid crystal display panel displays images, the absolute value of the voltage difference between the first common voltage $V_1$ and the second common voltage $V_2$ is between 2 voltage and 7 voltage, and thus the liquid crystal molecules can be transformed to a bend state from a splay state more quickly. Therefore, the liquid crystal display panel can have quicker response time.

In the embodiment as shown in FIG. 2B, the transition electrode 50 is a stripped electrode, and the transition electrode 50 is disposed on the insulating layer 40 over the capacitor electrode 70. However, in the present invention, the transition electrode 50 is not limited to a stripped electrode, and the transition electrode 50 is also not limited to being disposed on the insulating layer 40 over the capacitor electrode 70.

Figure 2C:
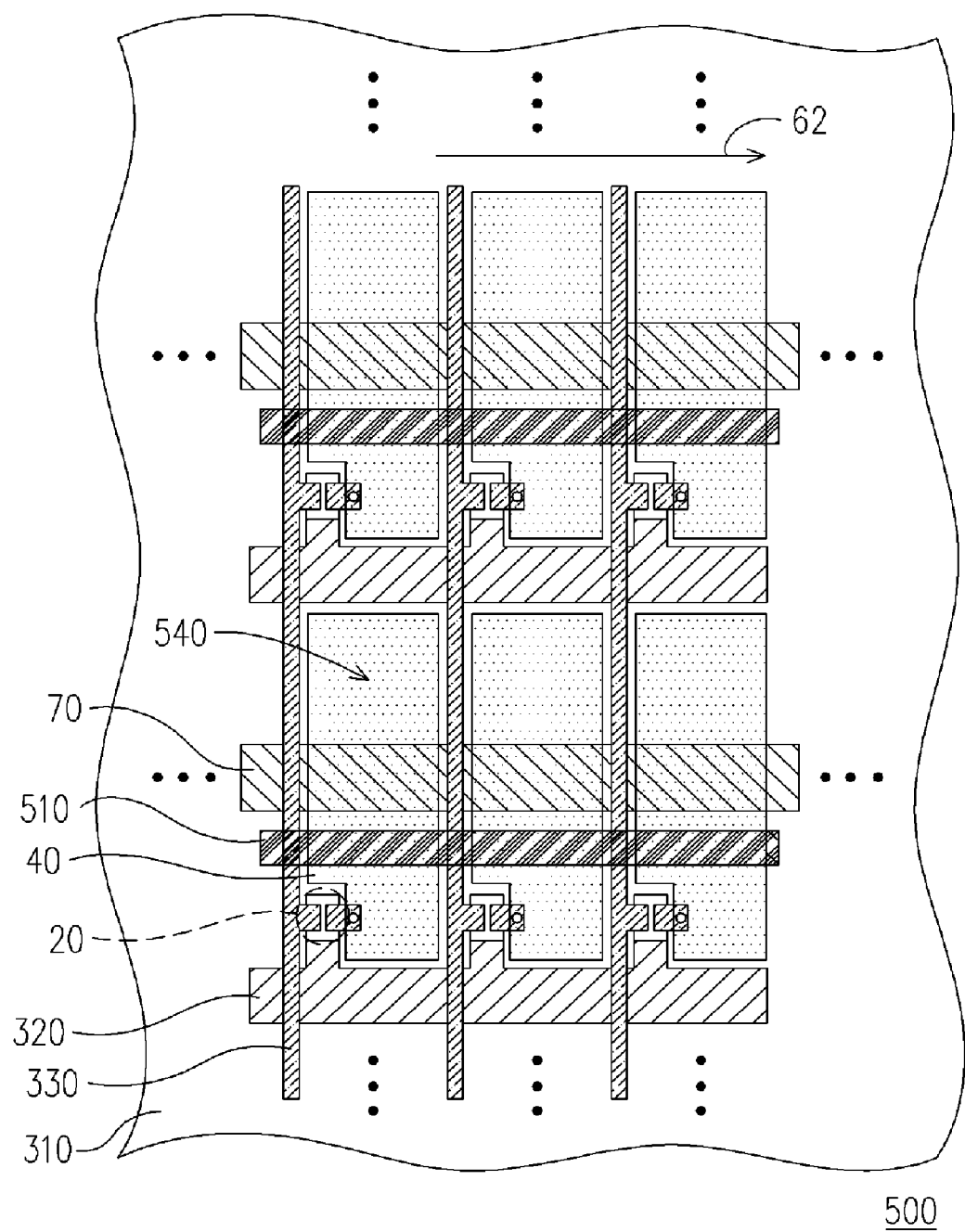
FIGS. 2C to 2G are top views showing pixel structures of other embodiments, respectively.
Figure 2D:
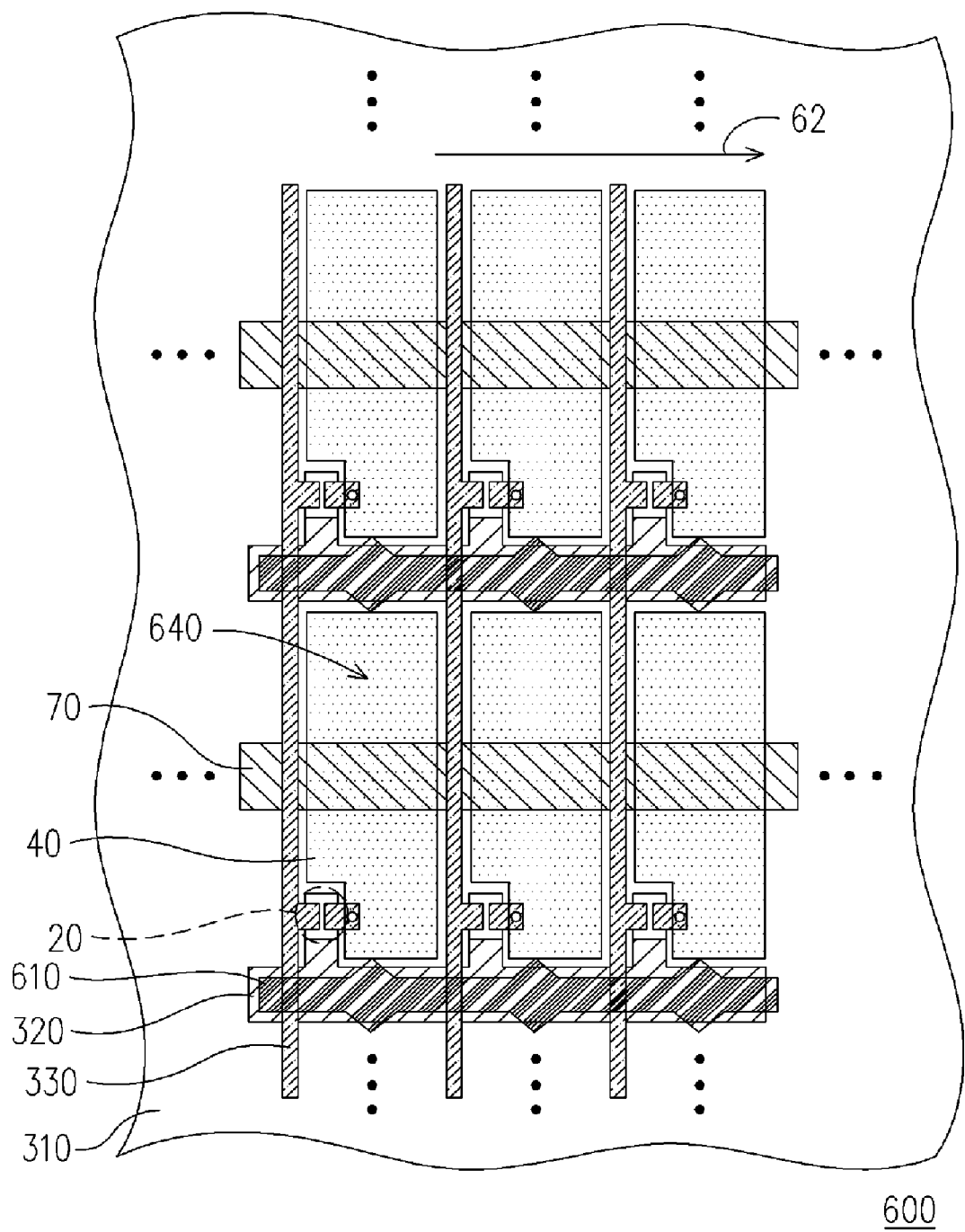
Figure 2E:
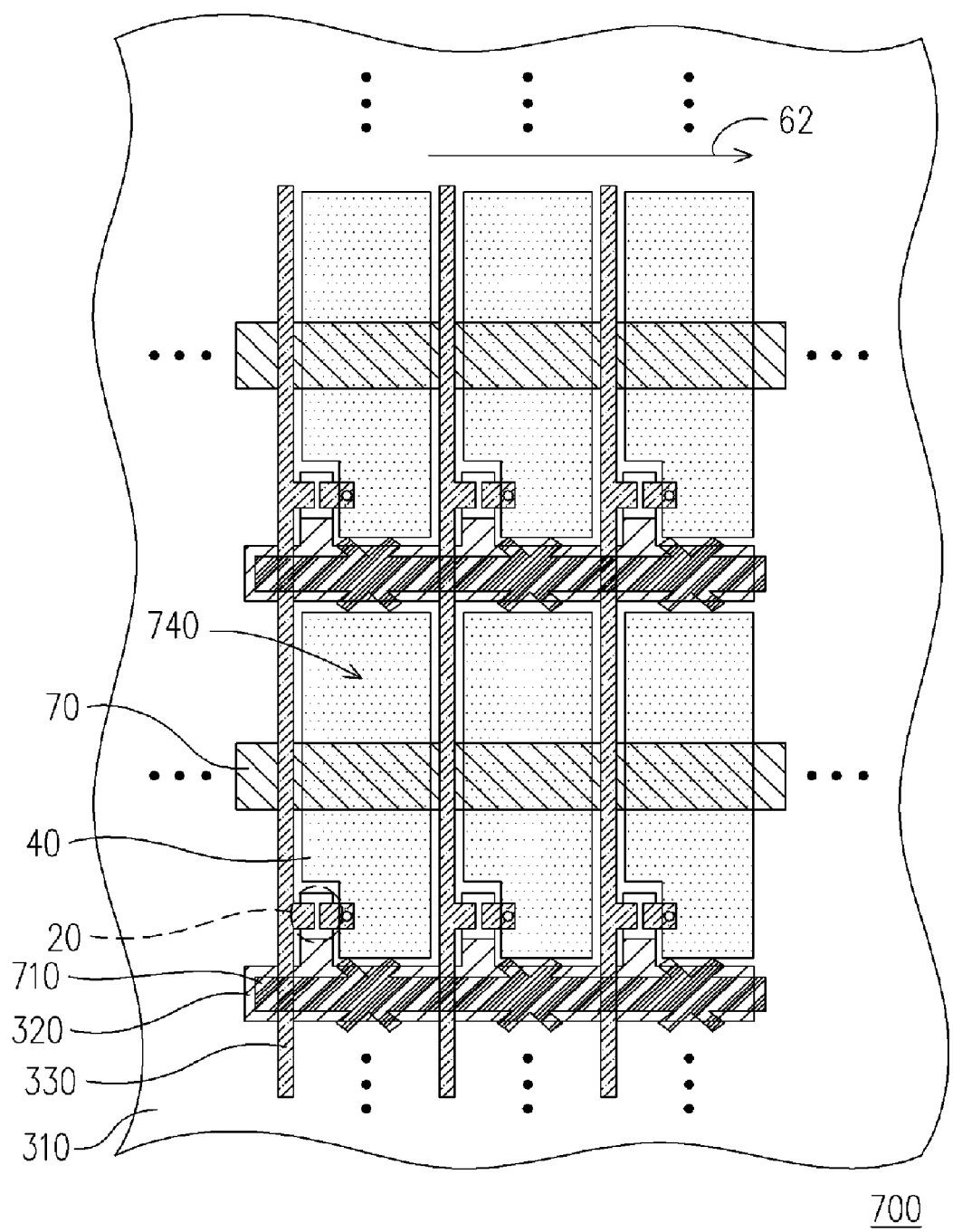
Figure 2F:
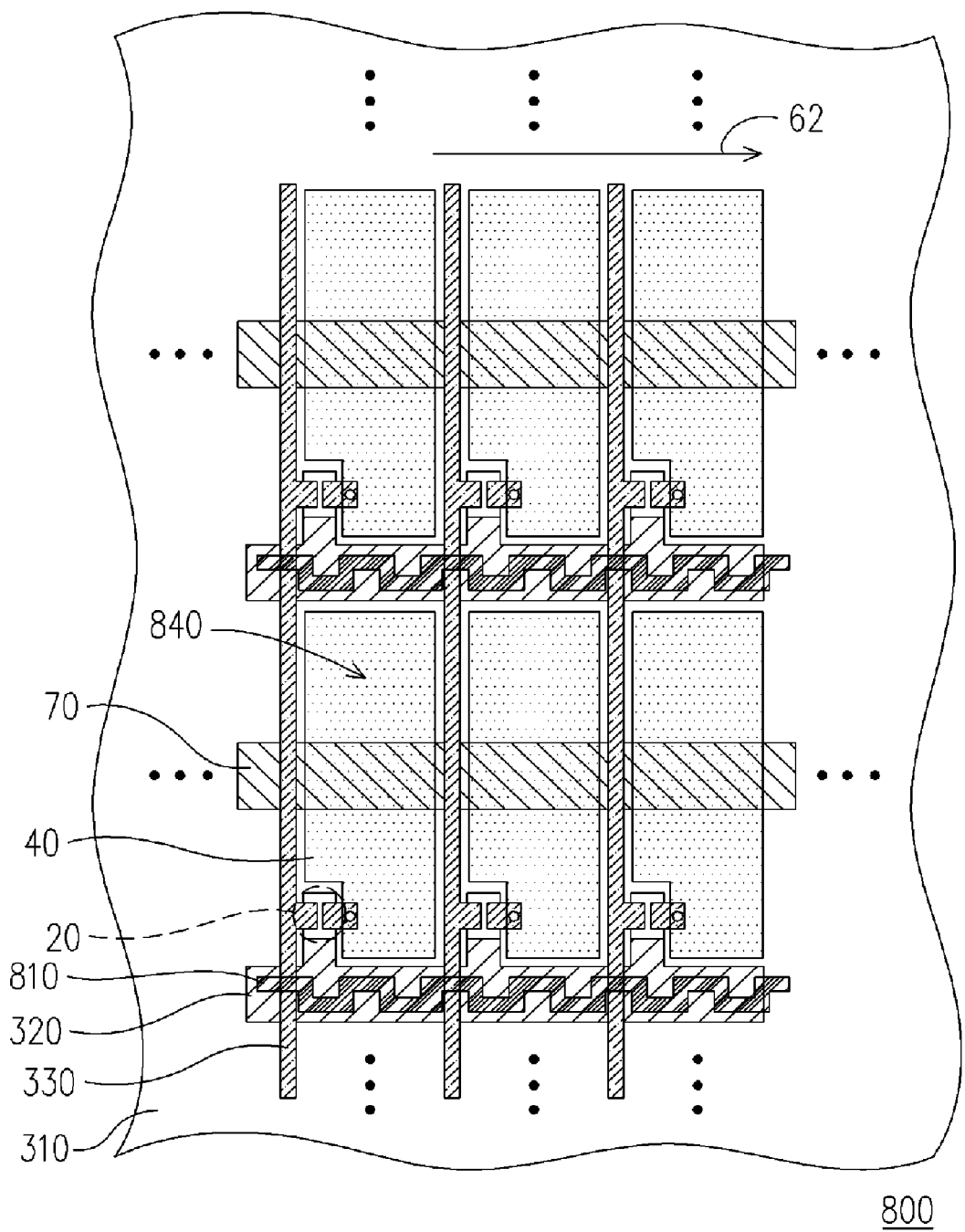
Figure 2G:
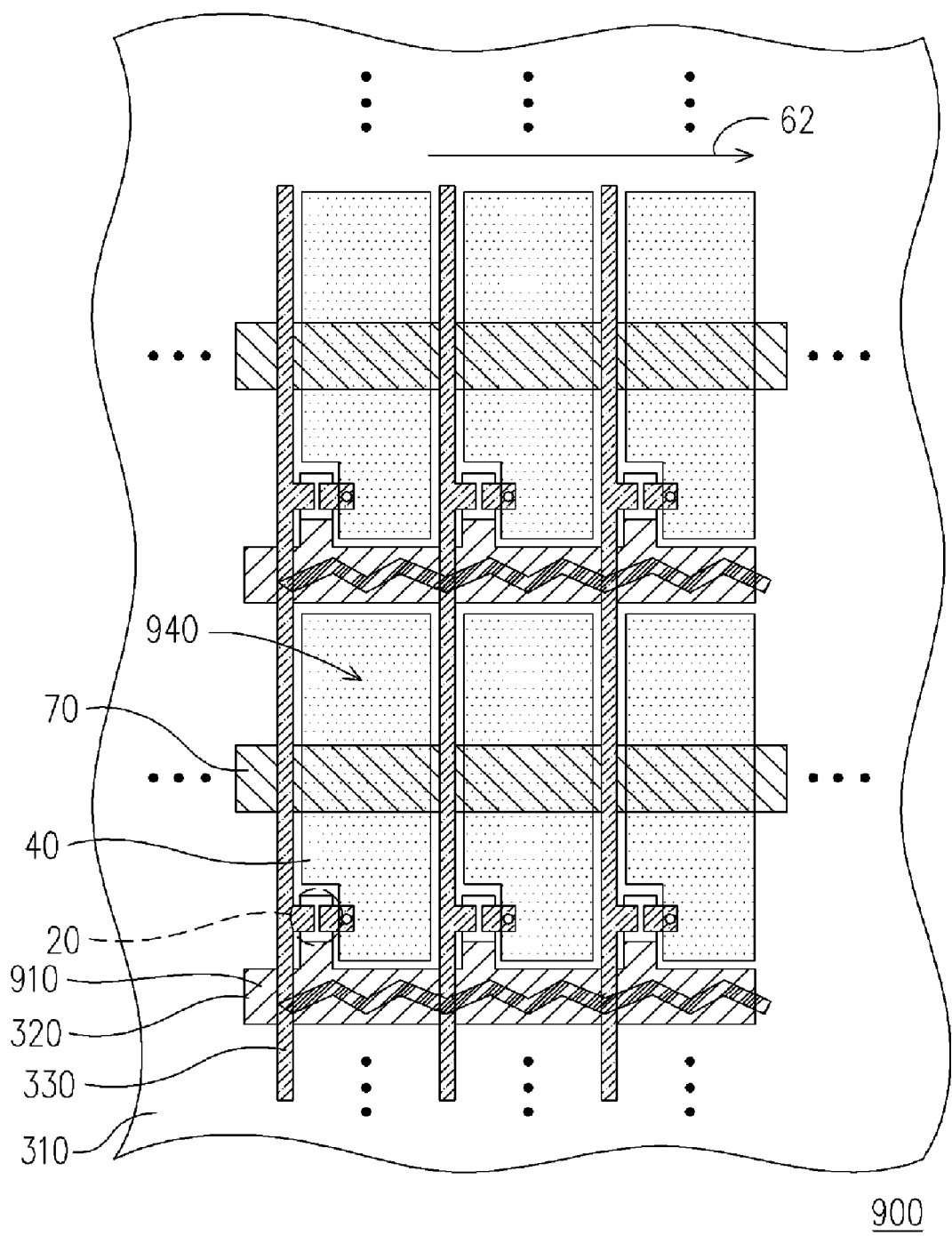

In the active device array substrate 500 of another embodiment as shown in FIG. 2C, the transition electrode 510 of the pixel structure 540 is disposed over the pixel electrode 40, but not stacked over the capacitor electrode 70. And, in the embodiment as shown in FIG. 2C, the material of the transition electrode 510 is preferably a transparent conducting material.

In addition, the transition electrode can also be disposed over the scan line, as shown in FIGS. 2D to 2G. In the active device array substrates 600, 700, 800, 900 in these embodiments, the transition electrodes 610, 710, 810, 910 of the pixel structures 640, 740, 840, 940 are all disposed over the scan line 320, and the shapes are not only stripped-shaped. As the transition electrodes 610, 710, 810, 910 are disposed over the scan line 320, the transition electrodes 610, 710, 810, 910 can be a transparent conducting material, and also the opaque conducting material. The pixel structures 540, 640, 740, 840, 940 as shown in FIG. 2C to 2G all have the same function as the above pixel structure 340; that is, a transversal electric field can be produced between the transition electrodes 510, 610, 710, 810, 910 in these pixel structures 540, 640, 740, 840, 940 and the pixel electrode 40. All of the liquid crystal display panels (not shown) made by using these pixel structures 540, 640, 740, 840, 940 also have quick response time.

Note that the structures (not only the stripped-shaped electrode) of the transition electrodes 610, 710, 810, 910 as shown in FIGS. 2D to 2G can also be disposed over the capacitor electrode 70 (the position of the transition electrode 50 as shown in FIG. 2B), or be disposed over the pixel electrode 40, but not stacked over the capacitor electrode 70 (the position of the transition electrode 510 as shown in FIG. 2C).

In summary, in the pixel structure of the present invention, a transversal electric field is produced between the transition electrode and the pixel electrode. If the pixel structure is applied in a liquid crystal display panel, the arrangement type of liquid crystal molecules in partial regions can be changed in advance. When the liquid crystal display panel displays images, the liquid crystal molecules can be transformed to a bend state quickly, so that the response time of the liquid crystal display panel is shortened. In addition, in the liquid crystal display panel, the voltage difference between the transition electrode and the color filter substrate can also be adjusted to change the intensity of the transverse electric field, so that the liquid crystal molecules can be transformed to a bend state from a splay state more quickly. That is, the liquid crystal display panel can have quicker response time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, suitable for being driven by a scan line and a data line, the pixel structure comprising:
    an active device, electrically connected to the scan line and the data line;
    a pixel electrode, electrically connected to the active device;
    an insulating layer, disposed over the scan line, the data line, and the pixel electrode; and
    a transition electrode, disposed on the insulating layer, the transition electrode and the pixel electrode generating a transverse electric field therebetween.

2. The pixel structure as claimed in claim 1, wherein the material of the transition electrode includes a transparent or opaque conducting material.

3. The pixel structure as claimed in claim 2, wherein the material of the transition electrode includes indium tin oxide (ITO), indium zinc oxide (IZO) or metal.

4. The pixel structure as claimed in claim 1, wherein the transition electrode is disposed over the pixel electrode.

5. The pixel structure as claimed in claim 1, wherein the transition electrode is disposed over the scan line.

6. The pixel structure as claimed in claim 1, wherein the transition electrode is electrically connected to a first common voltage $V_1$; the pixel electrode is electrically connected to a driving voltage $V_d$; the absolute value of the voltage difference between the first common voltage $V_1$ and the driving voltage $V_d$ is between about 3 voltage and 7 voltage.

7. The pixel structure as claimed in claim 1, further including an alignment layer, disposed over the insulating layer and the transition electrode, the alignment layer having a rubbing direction.

8. The pixel structure as claimed in claim 7, wherein the rubbing direction is different from the direction of the transverse electric field.

9. The pixel structure as claimed in claim 1, further including a capacitor electrode, disposed under the pixel electrode.

10. The pixel structure as claimed in claim 9, wherein the transition electrode is disposed on the insulating layer over the capacitor electrode.

11. A liquid crystal display panel, comprising:
    an active device array substrate, including:
        a first substrate;
        a plurality of scan lines, disposed on the first substrate;
        a plurality of data lines, disposed on the first substrate;
        a plurality of pixel structures, disposed on the first substrate, and driven by the scan lines and the data lines, respectively, wherein each pixel structure comprises:
            an active device, electrically connected to the corresponding scan line and data line;
            a pixel electrode, electrically connected to the corresponding active device;
            an insulating layer, disposed over the scan line, the data line, and the pixel electrode;
            a transition electrode, disposed on the insulating layer, the transition electrode and the pixel electrode generating a transverse electric field therebetween;
    a color filter substrate, disposed over the active device substrate, the color filter substrate comprising:
        a second substrate;
        a common electrode, disposed over the second substrate;
        a color filter layer, disposed between the second substrate and the common electrode; and
    a liquid crystal layer, disposed between the active device array substrate and the color filter substrate.

12. The liquid crystal display panel as claimed in claim 11, wherein the material of the transition electrode of the active device array substrate includes a transparent or opaque conducting material.

13. The liquid crystal display panel as claimed in claim 12, wherein the material of the transition electrodes includes indium tin oxide, indium zinc oxide or metal.

14. The liquid crystal display panel as claimed in claim 11, wherein the transition electrodes of the active device array substrate are disposed over the pixel electrodes.

15. The liquid crystal display panel as claimed in claim 11, wherein the transition electrodes of the active device array substrate are disposed over the scan lines.

16. The liquid crystal display panel as claimed in claim 11, wherein the transition electrodes of the active device array substrate are electrically connected to a first common voltage $V_1$; the pixel electrodes are electrically connected to a driving voltage $V_d$; the absolute value of the voltage difference between the first common voltage $V_1$ and the driving voltage $V_d$ is between about 3 voltage and 7 voltage.

17. The liquid crystal display panel as claimed in claim 11, wherein the active device array substrate further includes an alignment layer, disposed over the insulating layer and the transition electrode, and the alignment layer has a rubbing direction.

18. The liquid crystal display panel as claimed in claim 17, wherein the rubbing direction is different from the direction of the transverse electric field.

19. The liquid crystal display panel as claimed in claim 11, wherein the active device array substrate further includes a capacitor electrode, disposed under the pixel electrode.

20. The liquid crystal display panel as claimed in claim 19, wherein the transition electrodes of the active device array substrate are disposed on the insulating layer over the capacitor electrodes.

21. The liquid crystal display panel as claimed in claim 11, wherein the transition electrodes of the active device array substrate are electrically connected to a first common voltage $V_1$; the common electrode of the color filter substrate is electrically connected to a second common voltage $V_2$; the absolute value of the voltage difference between the first common voltage $V_1$ and the second common voltage $V_2$ is greater than 15 voltage.

22. The liquid crystal display panel as claimed in claim 21, wherein the absolute value of the voltage difference between the first common voltage $V_1$ and the second common voltage $V_2$ is between 15 voltage and 32 voltage.

* * * * *